United States Patent
Floch

(10) Patent No.: US 9,632,170 B2
(45) Date of Patent: Apr. 25, 2017

(54) EVALUATING THE POSITION OF AN AERIAL VEHICLE

(71) Applicant: Astrium GmbH, Taufkirchen (DE)

(72) Inventor: Jean-Jacques Floch, Munich (DE)

(73) Assignee: Astrium GmbH, Taufkirchen (DE)

(*) Notice: Subject to any disclaimer, the term of this patent is extended or adjusted under 35 U.S.C. 154(b) by 690 days.

(21) Appl. No.: 14/271,910

(22) Filed: May 7, 2014

(65) Prior Publication Data

US 2015/0226834 A1    Aug. 13, 2015

(30) Foreign Application Priority Data

May 8, 2013  (EP) .................................. 13290102

(51) Int. Cl.
| | |
|---|---|
| *G01S 5/02* | (2010.01) |
| *G01S 5/04* | (2006.01) |
| *G01S 3/74* | (2006.01) |
| *G01S 5/12* | (2006.01) |
| *G01S 19/21* | (2010.01) |
| *G01S 5/00* | (2006.01) |
| *H01Q 3/26* | (2006.01) |

(52) U.S. Cl.
CPC ....... *G01S 5/04* (2013.01); *G01S 3/74* (2013.01); *G01S 5/12* (2013.01); *G01S 5/0009* (2013.01); *G01S 19/21* (2013.01); *H01Q 3/26* (2013.01)

(58) Field of Classification Search
CPC ..... G01S 5/02; G01S 5/04; G01S 5/12; G01S 5/0009; G01S 19/21; H01Q 3/26

USPC .......................................................... 342/417
See application file for complete search history.

(56) References Cited

U.S. PATENT DOCUMENTS

| | | |
|---|---|---|
| 6,714,782 B1 | 3/2004 | Monot et al. |
| 8,010,287 B1 * | 8/2011 | Frank .................... B64D 39/00 244/135 A |
| 2005/0285788 A1 | 12/2005 | Xin |
| 2011/0001659 A1 | 1/2011 | Hampel et al. |

OTHER PUBLICATIONS

European Search Report dated Oct. 16, 2013 (Seven (7) pages).

* cited by examiner

*Primary Examiner* — Harry Liu
(74) *Attorney, Agent, or Firm* — Crowell & Moring LLP

(57) ABSTRACT

A method for evaluating the position of an aerial vehicle involves receiving a radio signal from the aerial vehicle with an antenna array, determining the direction of arrival of the received radio signal, forming a reception beam of the antenna array depending on the determined direction of arrival for receiving one or more further radio signals from the aerial vehicle, calculating the ranging between the aerial vehicle and the antenna array based on a radio signal provided for ranging and received from the aerial vehicle, and evaluating the position of the aerial vehicle based on the calculated ranging, the determined direction of arrival, and the known position of the antenna array.

12 Claims, 3 Drawing Sheets

EVALUATING THE POSITION OF AN AERIAL VEHICLE

CROSS REFERENCE TO RELATED APPLICATIONS

This application claims priority to EP 13 290 102.6, filed May 8, 2013, the entire disclosure of which is herein expressly incorporated herein by reference.

TECHNICAL FIELD

Exemplary embodiments of the invention relate to evaluating the position of an aerial vehicle, particularly an unmanned aerial vehicle.

BACKGROUND OF THE INVENTION

An unmanned aerial vehicle (UAV), commonly known as a drone, is an aircraft without a human pilot on-board. Its flight is either controlled autonomously by computers in the vehicle, or under the remote control of a navigator. An UAV has a navigation device on-board in order to be able to determine its position, which is important not only for autonomously controlled flights, but also for remote controlled flights since the navigator requires for flight control the actual position of an UAV.

If the navigation device on-board is not working properly and causes positioning errors, the UAV is out of control, and will not be able to fulfil its mission. The malfunction of the navigation device can be caused either by internal damage or by external interference. External interference can be intentionally or unintentionally caused. Intentional interference is usually caused by jammers, which are devices that interfere reception of radio signals such as GNSS (Global Navigation Satellite System) signals for positioning.

SUMMARY OF INVENTION

Therefore, exemplary embodiments of the invention are directed to evaluation of the position of an aerial vehicle such as an UAV.

The invention allows evaluating the position of an aerial vehicle based on the determination of the direction of arrival of radio signals received from the aerial vehicle. Thus, the position of an aerial vehicle can be evaluated independently of the position determined on-board of the aerial vehicle, which offers a control of the correct behavior of an aerial vehicle on-board navigation receiver and, furthermore, a backup solution if the on-board receiver is not properly working.

An embodiment of the invention involves a method for evaluating the position of an aerial vehicle comprising the following steps of receiving a radio signal from the aerial vehicle with an antenna array, determining the direction of arrival (DOA) of the received radio signal, forming a reception beam of the antenna array depending on the determined direction of arrival for receiving one or more further radio signals from the aerial vehicle, calculating the ranging between the aerial vehicle and the antenna array based on a radio signal provided for ranging and received from the aerial vehicle, and evaluating the position of the aerial vehicle based on the calculated ranging, the determined direction of arrival, and the known position of the antenna array. Thus, the vehicle's position can be evaluated using only a radio signal received from an aerial vehicle, which is provided for ranging. Any malfunction of a navigation receiver on-board the vehicle does not influence the position evaluation according to the invention.

The method may comprise the further step of detecting a positioning error by comparing the evaluated position of the aerial vehicle with position information received from the aerial vehicle. The error detection can be used to improve control of the aerial vehicle, particularly by ignoring the position information received from the aerial vehicle and using the evaluated position.

The method may further comprise the step of transmitting a message with the evaluated position to the aerial vehicle if a positioning error is detected. This enables the aerial vehicle to for example deactivate the navigation receiver on-board, or to switch to a backup navigation receiver installed in the aerial vehicle, for example to switch from a GNSS navigation receiver to an Inertial Navigation System (INS).

The determination of the direction of arrival of the received radio signal may comprise the following acts: collecting digital data from receiver chains of the antenna array, generating a covariance matrix from the collected digital data, completely evaluating the covariance matrix with a direction of arrival algorithm for determining the direction of arrival of the received radio signal, partially evaluating the covariance matrix with a direction of arrival algorithm considering the previously determined direction of arrival of the received radio signal for tracking the direction of arrival of received radio signal, estimating the trajectory and dynamic of the tracked received radio signal and determining the direction of arrival of the received radio signal based on the estimated trajectory and dynamic.

The act of completely evaluating the covariance matrix may be performed in parallel to and at a lower frequency than the act of partially evaluating the covariance matrix.

The act of completely evaluating the covariance matrix may particularly be performed every three time units and the act of partially evaluating the covariance matrix may particularly be performed every time unit.

In particular, Estimation Signal Parameter via a Rotational Invariant Technique (ESPRIT) and/or Multiple Signal Classification (MUSIC) can be used as direction of arrival algorithms in the act of completely evaluating the covariance matrix and/or the act of partially evaluating the covariance matrix.

The act of completely evaluating of the covariance matrix with a direction of arrival may comprise sequentially evaluating the covariance matrix during a time interval with a direction of arrival algorithm for determining the direction of arrival of the received radio signal, wherein the time interval is selected such that the aerial vehicle is considered to be static during the selected time interval.

A further embodiment of the invention relates to a computer program, which implements the method for detecting of positioning errors of a navigation device on-board of an aerial vehicle according to the invention and as described herein and enabling detecting of positioning errors of a navigation device on-board of an aerial vehicle according to the invention when executed by a computer. Such a computer program could be used by a computer equipped with a receiver comprising an antenna array for receiving radio signals from an aerial vehicle, enabling the computer to detect positioning errors of the navigation device on-board of the aerial vehicle.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention relates to a device for detecting of positioning errors of a navigation device on-board of an aerial vehicle comprising an antenna array for receiving a radio signal from the aerial vehicle, means for determining the direction of arrival of the received radio signal, means for forming a reception beam of the antenna array depending on the determined direction of arrival for receiving one or more further radio signals from the aerial vehicle, means for calculating the ranging between the aerial vehicle and the antenna array based on a radio signal provided for ranging and received from the aerial vehicle, means evaluating the position of the aerial vehicle based on the calculated ranging, the determined direction of arrival, and the known position of the antenna array, and means for detecting a positioning error by comparing the evaluated position of the aerial vehicle with the position information received from the aerial vehicle.

The antenna array may be a multiple-element array antenna, particularly a linear array antenna, a hemi-spherical antenna, or a spherical antenna.

The device may comprise a processor being configured by a computer program of the invention to implement a method of the invention and as described herein.

A yet further embodiment relates to an aerial vehicle, particularly an unmanned aerial vehicle, comprising a navigation device for determining the position of the aerial vehicle and a radio signal communication unit for transmitting one or more radio signals comprising data about the determined position of the aerial vehicle and ranging information and for receiving a message from a device for detecting of positioning errors of a navigation device on-board of an aerial vehicle according to the invention and as described herein.

The radio signal communication unit may be provided to transmit the data about the determined position of the aerial vehicle and the ranging information with the same modulated radio signal, particularly via a GMSK signal standardized according to the Consultative Committee for Space Data Systems (CCSDS), or with different radio signals, particularly on different transmission frequencies.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
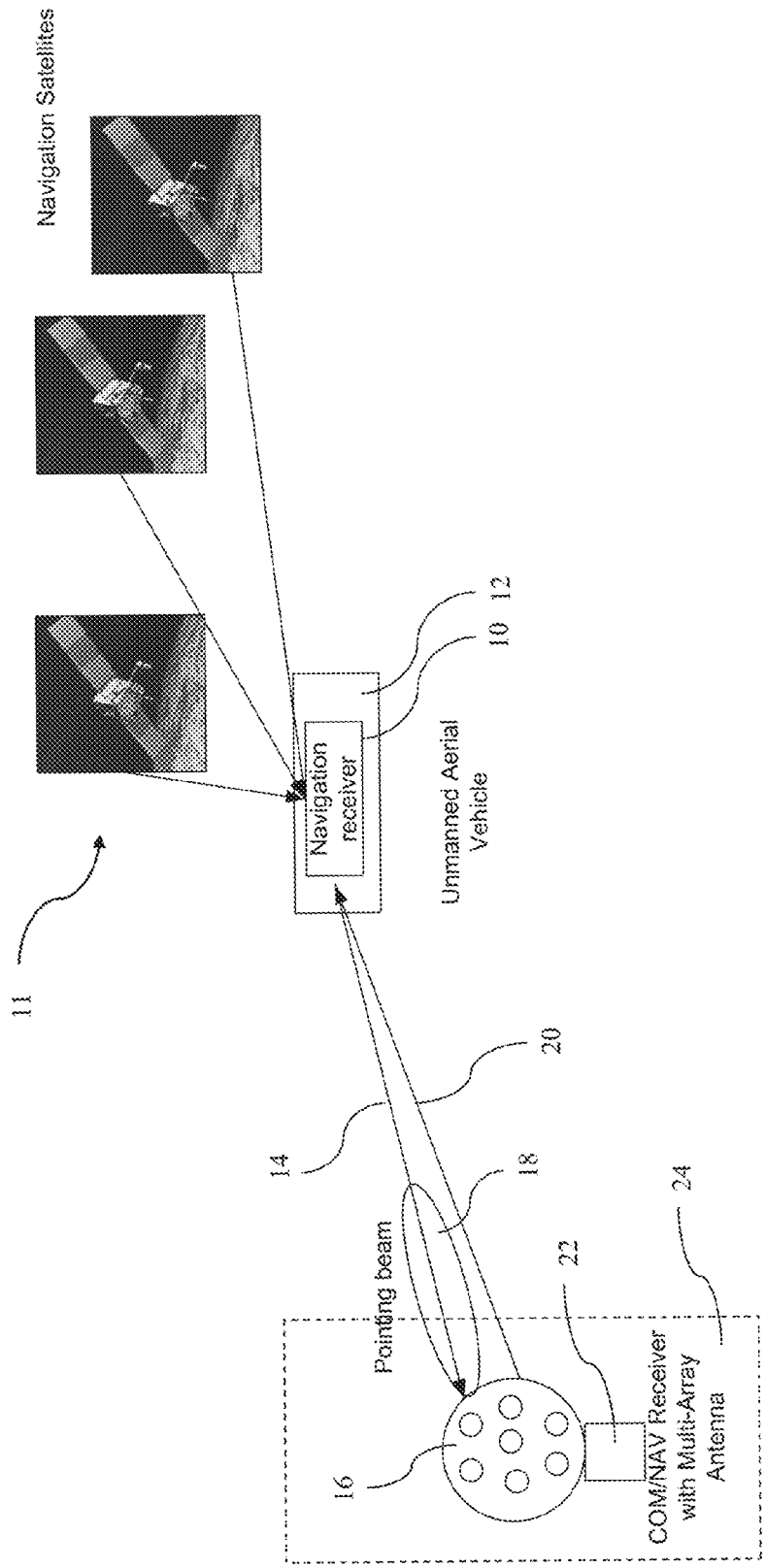
FIG. 1 shows an UAV with a GNSS navigation device on-board and COM/NAV receiver with a multi-array antenna for detecting positioning errors of the UAV navigation device and signaling detect positioning errors to the UAV according to an embodiment of the invention.

In the following, functionally similar or identical elements may have the same reference numerals. Absolute values are shown below by way of example only and should not be construed as limiting the invention.

The principle of the present invention is explained in the following with reference to FIG. 1. An UAV 12 evaluates its position with an on-board navigation device 10. In the embodiment shown in FIG. 1, the navigation device 12 is implemented as GNSS navigation device, which receives GNSS positioning signals from GNSS satellites 11 and/or from pseudolites (not shown). However, any other navigation device can be on-board of the UAV 12, instead of or additionally to the GNSS navigation receiver, such as an INS, or a hybrid positioning system (GNSS+INS). The navigation device 10 on board of the UAV 12 determines the actual position of the UAV 12. In FIG. 1, the navigation device 10 uses GNSS positioning signals received from different GNSS satellites 11 for determining the actual position. Position determination can be performed continuously or periodically. Typically, the UAV 12 determines its position autonomously according an implemented control algorithm. Alternatively or additionally, the UAV 12 can determine its position also on request for example from a ground control system transmitting a respective control command to the UAV 12.

The determined position of the UAV 12 is transmitted via telemetry to a receiver station 24. A radio signal communication unit on-board the UAV 12 can transmit the positioning data with an UAV radio signal 14. The radio signal communication unit can also transmit a ranging signal with ranging information. The ranging signal and the telemetry or positioning data can be transmitted within the same modulated UAV radio signal 14, for example by means of a simultaneous transmission of the signal via a GMSK-like signal according to the new CCSDS concept, or they can be transmitted with different UAV radio signals 14 on different frequencies.

Figure 2:
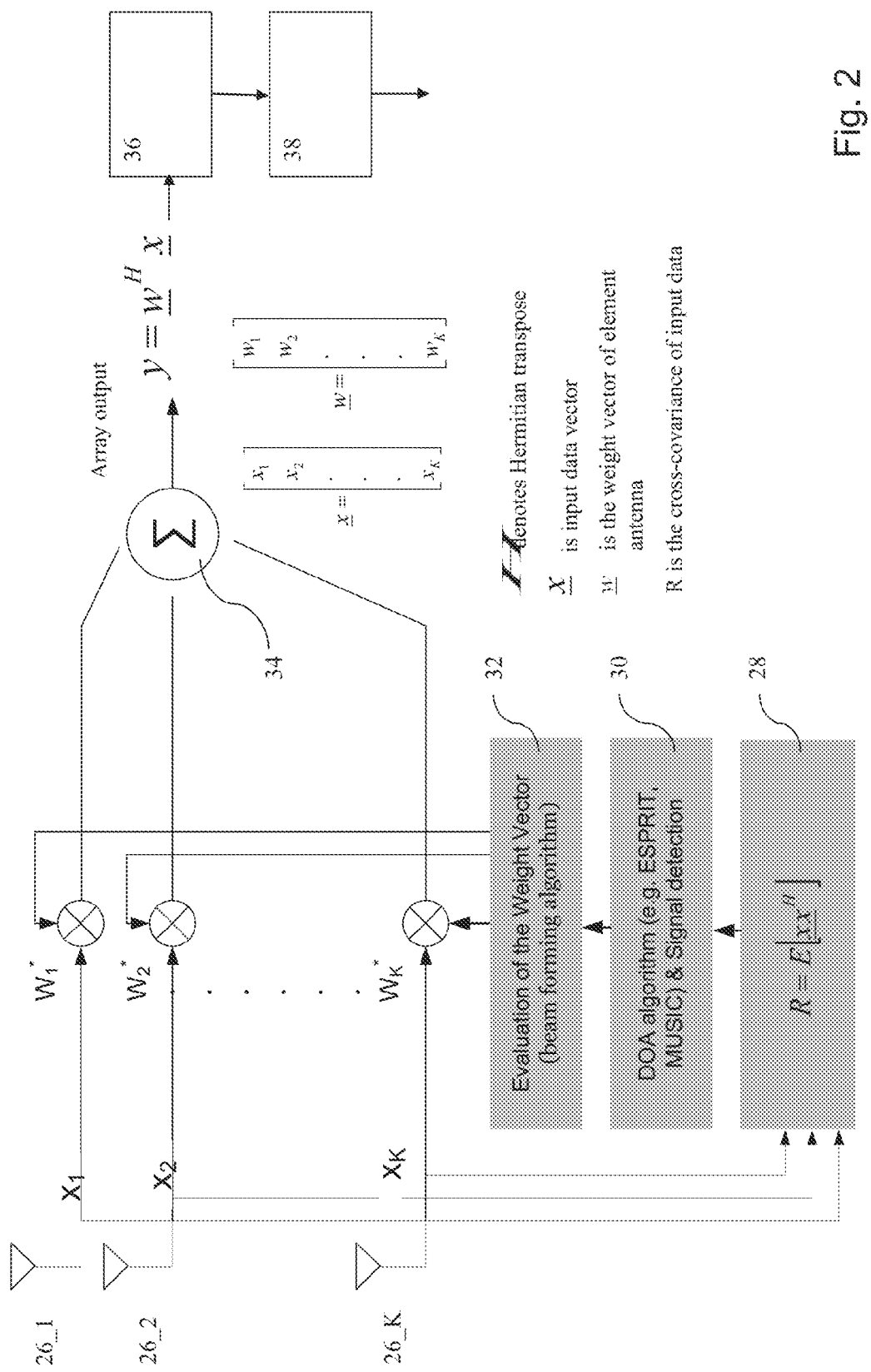
FIG. 2 shows a block diagram of an embodiment of a device for detecting of positioning errors of a navigation device on-board of an UAV according to the invention.

The receiver station 24 can be mobile but needs to know its position in real time. The receiver station 24 can, for example, determine its actual position by receiving the GNSS positioning signals from the GNSS satellites 11 and/or from pseudolites or by means of an INS or hybrid positioning system. For receiving and processing the UAV radio signal 14, the receiver station 24 comprises a multiple-element antenna array/multi-array antenna 16. The antenna 16 can be implemented as a linear array antenna, or hemi-spherical antenna or a spherical antenna. As shown in FIG. 2, the multi-array antenna 16 comprises K array elements 26_1-26_K forming K receiver chains. The signals received with the multi-array antenna 16 are processed in a signal processing and beam forming unit 22 of the station 24.

The signal processing and beam forming is now explained in detail with reference to FIG. 2, which shows a block diagram of a circuitry of the signal processing and beam forming unit 22 provided for signal processing of the UAV radio signal 14 received via multi-array antenna 16 and for beam forming. With the signal processing, the DOA of the UAV radio signal 14 will be determined and used for the beam forming, which serves to receive one or more further UAV radio signals 14 comprising telemetry or positioning data of the UAV 12 or are provided for ranging, i.e. for determining the range between the receiver station 24 and the UAV 12 in order to be able to check whether the positioning data received from the UAV 12 is correct or not.

The UAV radio signal 14 is received with each of the K antenna array elements 26_1-26_K. Each of the K signals from the elements 26_1-26_K are digitized in a RF front end circuitry (not shown) in order to generate digital data $X_1$-$X_K$ from the K receiver chains. The digital data $X_1$-$X_K$ are supplied to a covariance processing unit 28, which evaluates the (cross-) covariance matrix R from the collected digital data $X_1$-$X_K$ according to the following equation:

$$R = E[\underline{x}\,\underline{x}^H]$$

with $\underline{x}=(X_1, X_2, \ldots, X_K)$ being the vector with the digital data $X_1$-$X_K$ as elements, H denoting the Hermitian transpose, and E being an expectation operator. The cross-covariance matrix R is a spatial correlation matrix of the outputs of the K antenna array elements 26_1-26_K.

The cross-covariance matrix R is then supplied to a DOA algorithm processing unit 30 for evaluating the DOA of the UAV radio signal 14 using a DOA Algorithm, for example ESPRIT or MUSIC. As any DOA algorithm is time consuming, it is normally difficult to determine the position (azimuth/elevation) of a moving target like an UAV 12 in real time. Therefore, the following algorithm according to the invention is applied by the DOA algorithm processing unit 30:

The covariance matrix R is completely evaluated with a DOA algorithm. This evaluation act comprises a sequential evaluation of the covariance matrix during a short time interval, during which the target (the UAV 12) is static during the evaluation. The time interval is typically selected depending on the actual speed of the UAV 12. For each covariance matrix of the sequential evaluation, the eigenvalues can be evaluated (this act is required for some algorithms e.g. MUSIC, which use the eigenvalues for DOA determination). Thereafter, the corresponding DOA is evaluated. Then, an initial DOA complete scan follows (elevation/azimuth) for determining the DOA of the UAV radio signal 14.

In order to decrease the algorithm computation time without decreasing its accuracy, the algorithm continues now with a partial evaluation of the covariance matrix considering the previously determined DOA of the UAV radio signal 14, or in other words performs only a partial scan considering the previous target position.

The DOA complete scan can, for example, be executed by the DOA algorithm processing unit 30 in parallel at a lower frequency than the partial scan to screen potential targets. Also, the DOA complete scan can be executed for example every three time units, while the partial DOA scan is executed every time unit of a clocking scheme of the DOA algorithm processing unit 30.

Finally, the trajectory and dynamic of the tracked UA radio signal 14 is estimated and the DOA of the UAV radio signal 14 can be determined based on the estimated trajectory and dynamic.

Figure 3:
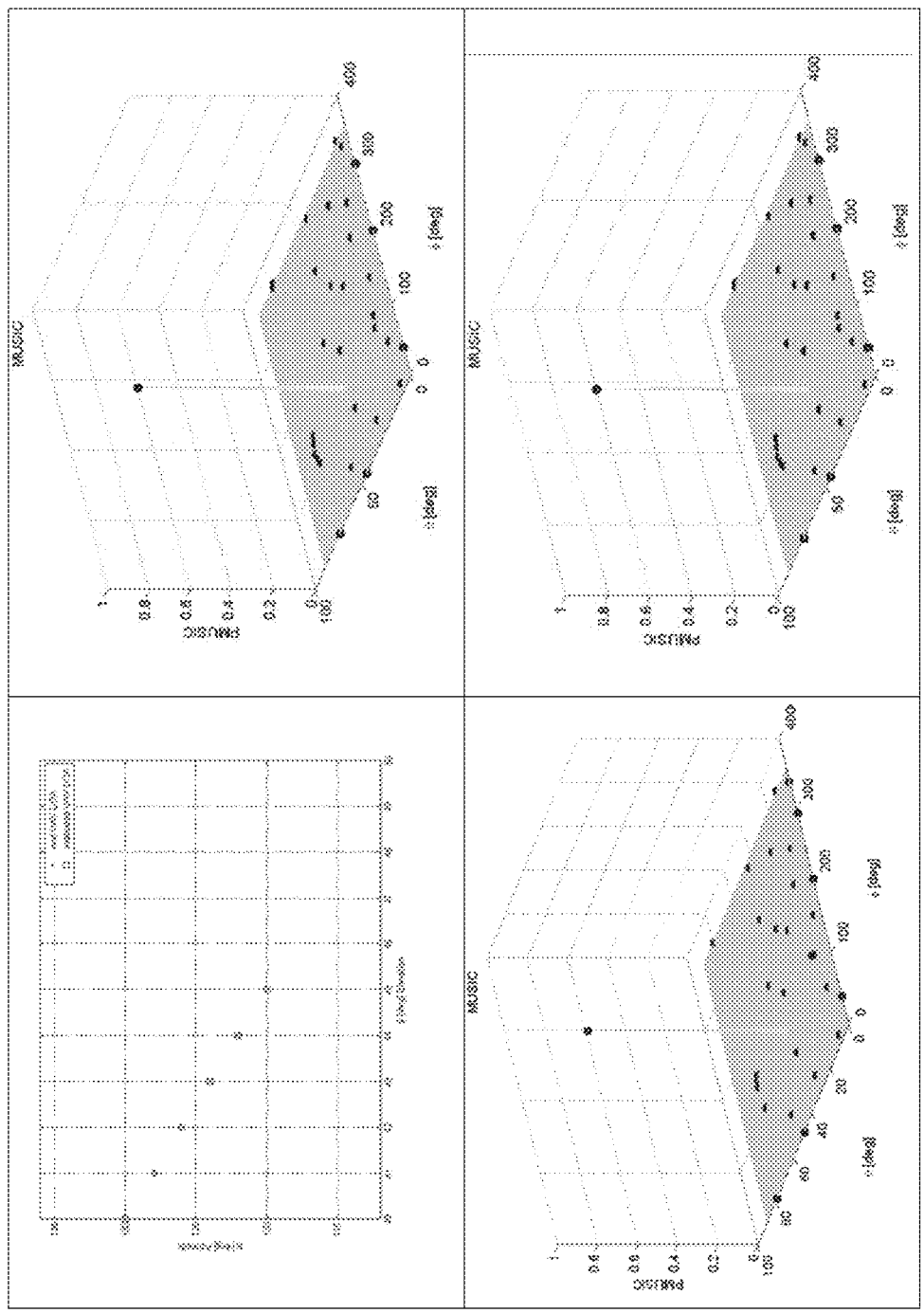
FIG. 3 shows examples of diagrams with the DOAs of a moving UAV determined with an algorithm according to the invention.

An example of the tracking according to the algorithm performed by the DOA algorithm processing unit 30 is shown in FIG. 3, considering the UAV 12 going from azimuth 130 degrees to 120 degrees and elevation going from 40 degree to 45 degrees. For this example, the MUSIC algorithm was used as DOA determination algorithm and a complete scan was done every three time units (t1, t3, t6, ...).

Once the DOA of the UAV radio signal 14 is found and tracked, a beam forming algorithm processing unit 32 applies a beam forming algorithm to form a reception beam 18 directed to the UAV 12 for receiving further UAV radio signals 14 with telemetry or positioning data and provided for ranging via the multi-array antenna 16. The beam forming algorithm calculates a weight vector $\underline{w}$ comprising, for each of the K antenna array elements 26_1-26_K, a weighting factor $W^*_1$-$W^*_K$. The weight vector $\underline{w}$ steers the antenna reception beam 18 to the UAV radio signal 14 transmitter of the UAV 12 in order to ensure optimal reception of the UAV radio signals 14. The digital data $X_1$-$X_K$ of the received UAV radio signals 14 are multiplied in the K receiver chains with the weights of the weight vector $\underline{w}$ and summed with a summer 34 resulting in a digital data stream y:

$$y = \underline{w}^H \underline{x}$$

A ranging calculator 36 of the receiver station 24 then demodulates the telemetry or positioning data including the position of the UAV 12 evaluated on-board the UAV 12 from the digital data stream y. If telemetry and ranging are transmitted within the same modulated signal, the same beam as the telemetry beam forming can be used. If a different UAV radio signal 14 is provided for ranging, a beam forming can be also simultaneously evaluated for receiving this ranging UAV radio signal 14. In such case, the weight vector $\underline{w}$ can be changed to steer the reception beam 18 to the ranging UAV radio signal 14. The ranging calculator 36 then calculates the ranging between the UAV 12 and the multi-array antenna 16. The ranging calculator 36 forwards the calculated ranging, the demodulated positioning data determined by the GNSS navigation device 10 on-board the UAV 12 and the DOA of the UAV radio signal 14 to a position evaluator 38 of the receiver station 24.

Knowing the position of the multi-array antenna 16, the DOA of the UAV radio signal 14 and the ranging between the UAV 12 and the multi-array antenna 16, the position evaluator 38 evaluates the position of the UAV 12, and compares the evaluated UAV position to the position evaluated in the UAV 12 and received via the telemetry data. If the comparison results in that the position evaluated by the UAV 12 is wrong, the receiver station 24 can transmit a radio signal 20 with positioning error message via telemetry to the UAV 12. The positioning error message can comprise the correct UAV position evaluated by the receiver station 24 to the UAV and a message to not consider the position evaluated on-board the UAV 12.

The present invention allows using antenna array techniques to locate an aerial vehicle such as an UAV (azimuth and elevation) and to determine the ranging between the aerial vehicle and a receiver station. The position of the aerial vehicle can therefore be precisely evaluated in the receiver station. This technique can be applied during operational mode to ensure that a navigation device on-board of an aerial vehicle is correctly working and is not disturbed by internal or external threats. During a test mode, this technique can also be used to verify the correct behaviour of the navigation device on-board of an aerial vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS AND ACRONYMS

10 GNSS navigation device
11 GNSS satellites
12 UAV
14 UAV radio signal
16 multiple-element antenna array/multi-array antenna
18 formed reception beam
20 radio signal with positioning error message
22 signal processing and beam forming unit 24 receiver station
26_1-26_K K antenna array elements
$X_1$-$X_K$ K digital data of the K receiver chains
$W_1$-$W_K$ K weights
28 covariance processing unit
30 DOA algorithm processing unit
32 beam forming algorithm processing unit
34 summer
36 ranging calculator
38 position evaluator
CCSDS Consultative Committee for Space Data Systems
DOA Direction Of Arrival
ESPRIT Estimation Signal Parameter via a Rotational Invariant Technique
GMSK Gaussian Minimum Shift Keying
GNSS Global Navigation Satellite System
INS Inertial Navigation System
MUSIC Multiple Signal Classification
UAV Unmanned Aerial Vehicle

What is claimed is:

1. A method for evaluating a position of an aerial vehicle comprising the steps:
receiving, by an antenna array, a radio signal and a ranging radio signal transmitted from the aerial vehicle;
determining a direction of arrival of the radio signal received at the antenna array;
forming a reception beam of the antenna array depending on the determined direction of arrival, wherein the formed reception beam is used to receive one or more further radio signals from the aerial vehicle;
calculating, using the ranging radio signal received from the aerial vehicle, a ranging between the aerial vehicle and the antenna array; and
determining the position of the aerial vehicle based on the calculated ranging, the determined direction of arrival, and a known position of the antenna array.

2. The method of claim 1 further comprising the step of:
detecting a positioning error by comparing the determined position of the aerial vehicle with position information received from the aerial vehicle.

3. The method of claim 1, further comprising the step of:
transmitting a message with the determined position to the aerial vehicle.

4. The method of claim 1, wherein the determination of the direction of arrival of the received radio signal comprises the steps:
collecting digital data from receiver chains of the antenna array;
generating a covariance matrix from the collected digital data;
completely evaluating the covariance matrix with a direction of arrival algorithm for determining the direction of arrival of the received radio signal;
partially evaluating the covariance matrix with a direction of arrival algorithm considering the previously determined direction of arrival of the received radio signal for tracking the direction of arrival of received radio signal; and
estimating a trajectory and dynamic of the tracked received radio signal and determining the direction of arrival of the received radio signal based on the estimated trajectory and dynamic.

5. The method of claim 4, wherein the step of completely evaluating the covariance matrix is performed in parallel to and at a lower frequency than the act of partially evaluating the covariance matrix.

6. The method of claim of claim 5, wherein the step of completely evaluating the covariance matrix is performed every three time units and the act of partially evaluating the covariance matrix is performed every time unit.

7. The method of claim 4, wherein the complete or partial evaluation of the covariance matrix employs ESPRIT or MUSIC as the direction of arrival algorithm.

8. The method of claim 4, wherein the step of completely evaluating the covariance matrix with the direction of arrival comprises:
sequentially evaluating the covariance matrix during a time interval with a direction of arrival algorithm for determining the direction of arrival of the received radio signal, wherein the time interval is selected such that the aerial vehicle is considered to be static during the selected time interval.

9. A computer program embodied in a non-transitory computer readable medium, which when executed by a processor causes the processor to perform the steps of:
receiving, by an antenna array, a radio signal and a ranging radio signal transmitted from an aerial vehicle;
determining a direction of arrival of the radio signal received at the antenna array;
forming a reception beam of the antenna array depending on the determined direction of arrival, wherein the formed reception beam is used to receive one or more further radio signals from the aerial vehicle;
calculating, using the ranging radio signal received from the aerial vehicle, a ranging between the aerial vehicle and the antenna array; and
determining the position of the aerial vehicle based on the calculated ranging, the determined direction of arrival, and a known position of the antenna array.

10. A device configured to evaluate a position of an aerial vehicle, the device comprising:
an antenna array configured to receive a radio signal and a ranging radio signal transmitted from the aerial vehicle; and
a processor configured to
determine a direction of arrival of the radio signal received at the antenna array;
form a reception beam of the antenna array depending on the determined direction of arrival for receiving one or more further radio signals from the aerial vehicle;
calculate ranging between the aerial vehicle and the antenna array based on the ranging radio signal received from the aerial vehicle; and
determine the position of the aerial vehicle based on the calculated ranging, the determined direction of arrival, and a known position of the antenna array.

11. The device of claim 10, wherein the antenna array is a multiple-element array antenna.

12. The device of claim 11, wherein the multiple-element array antenna is a linear array antenna, a hemi-spherical antenna, or a spherical antenna.

* * * * *